United States Patent
Ann

[19]

[11] Patent Number: 5,870,392
[45] Date of Patent: Feb. 9, 1999

[54] MICROCELL ARCHITECTURE

[75] Inventor: Bau-Hsing Brian Ann, Parsippany, N.J.

[73] Assignee: Lucent Technologies Inc., Murray Hill, N.J.

[21] Appl. No.: 579,946

[22] Filed: Dec. 28, 1995

[51] Int. Cl.$^6$ .............................. H04B 7/216; H04Q 7/00
[52] U.S. Cl. .......................... 370/335; 370/328; 370/342; 455/449
[58] Field of Search ..................................... 370/328, 329, 370/330, 335, 338, 342; 455/33.1, 33.4, 449

[56] References Cited

U.S. PATENT DOCUMENTS

| | | |
|---|---|---|
| 5,067,147 | 11/1991 | Lee . |
| 5,067,173 | 11/1991 | Gordon ................................... 359/152 |
| 5,164,958 | 11/1992 | Omura . |
| 5,193,091 | 3/1993 | Crisler et al. . |
| 5,193,109 | 3/1993 | Lee . |
| 5,243,598 | 9/1993 | Lee . |
| 5,278,991 | 1/1994 | Ramsdale et al. . |
| 5,345,499 | 9/1994 | Benveniste . |
| 5,349,632 | 9/1994 | Nagashima . |
| 5,363,428 | 11/1994 | Nagashima . |
| 5,392,453 | 2/1995 | Gudmundson et al. . |
| 5,396,645 | 3/1995 | Huff . |
| 5,550,898 | 8/1996 | Abbasi ....................................... 379/59 |
| 5,579,374 | 11/1996 | Doi ............................................ 379/59 |
| 5,627,879 | 5/1997 | Russell ...................................... 379/59 |

*Primary Examiner*—Douglas W. Olms
*Assistant Examiner*—David R. Vincent

[57] ABSTRACT

A microcell architecture includes a macrocell base station capable of receiving signals from and transmitting signals to at least one microcell base station provided within a first predefined geographic area. The macrocell base station includes circuitry for converting downstream channel unit information to downstream baseband channel information and for modulating and transmitting the downstream baseband channel information. It also includes circuitry for demodulating received upstream baseband channel information and for converting the received baseband channel information to upstream channel unit information. Also provided is at least one microcell base station, provided within the first predefined geographic area, for communicating with wireless terminals within a second smaller predefined geographic area within the first predefined geographic area. The at least one microcell base station receives and demodulates the downstream baseband channel information and modulates it to an intermediate frequency signal for transmission to a wireless terminal. The at least one microcell base station also receives and converts upstream information from a wireless terminal to an intermediate frequency signal, separates the upstream information into baseband channel information and modulates and transmits it as the upstream baseband channel information to the macrocell basestation.

15 Claims, 4 Drawing Sheets

MICROCELL ARCHITECTURE

BACKGROUND OF THE INVENTION

1. Field of the Invention

The present invention relates to telecommunication systems in general and, more particularly, to a microcell architecture for a telecommunications system.

2. Description of the Related Art

A microcell network architecture typically covers "dead-spots" or high traffic density areas occurring in larger macrocells. For example, one cell structure that may be suitable for high traffic personal communication networks includes a plurality of macrocells. A plurality of microcells are selectively deployed within a macrocell in areas of very high traffic density. The microcell architecture allows an increase in caller handling capacity. A typical macrocell may be 1 km or more in radius. A typical microcell may cover an area of approximately 200 m radius, for example, with each microcell typically having a capacity of handling 8~16 callers.

Each microcell includes a microcell base station that relays information between any wireless terminals within the microcell and a facility such as a macrocell base station or a wireless switching center. For ease of deployment it is preferable to have small, compact microcell base stations. However, due to the complexity of the communication equipment necessary, particularly when a code division multiple access (CDMA) technique is employed as the communication standard, it is often difficult to design a small compact stand alone microcell base station. In addition, due to the relatively large number of microcell base stations that may be required to cover large traffic areas, it is important to keep the cost of each microcell base station to a minimum.

SUMMARY OF THE INVENTION

A microcell architecture includes a macrocell base station capable of receiving signals from and transmitting signals to at least one microcell base station provided within a first predefined geographic area. The macrocell base station includes circuitry for converting downstream CDMA channel unit information to downstream baseband channel information and for modulating and transmitting the downstream baseband channel information. The macrocell base station also includes circuitry for demodulating received upstream channel information and for converting the received channel information to upstream CDMA channel unit information. At least one microcell base station is provided within the first predefined geographic area for communicating with wireless terminals within a second smaller predefined geographic area within the first predefined geographic area. The at least one microcell base station receives and demodulates the downstream channel information to baseband channel information and modulates it for transmission to a wireless terminal. The at least one microcell base station receives and demodulates channel information from a wireless terminal and modulates and transmits it as the upstream channel information. At least one transmission line interconnects the macrocell base station and the at least one microcell base station, allowing the downstream and upstream channel information to be communicated therebetween. The transmission line can consist of a coaxial cable, a twisted pair or a fiber optic cable. The macrocell base station and the at least one microcell base station can include cable TV modulators/demodulators for modulating and demodulating signals communicated therebetween over the transmission line.

BRIEF DESCRIPTION OF THE DRAWINGS

So that one skilled in the art to which the present disclosure relates will better understand how to practice embodiments of the present disclosure, the preferred embodiments will be described in detail below with reference to the accompanying drawings, in which.

DETAILED DESCRIPTION OF THE PREFERRED EMBODIMENTS

Figure 1:
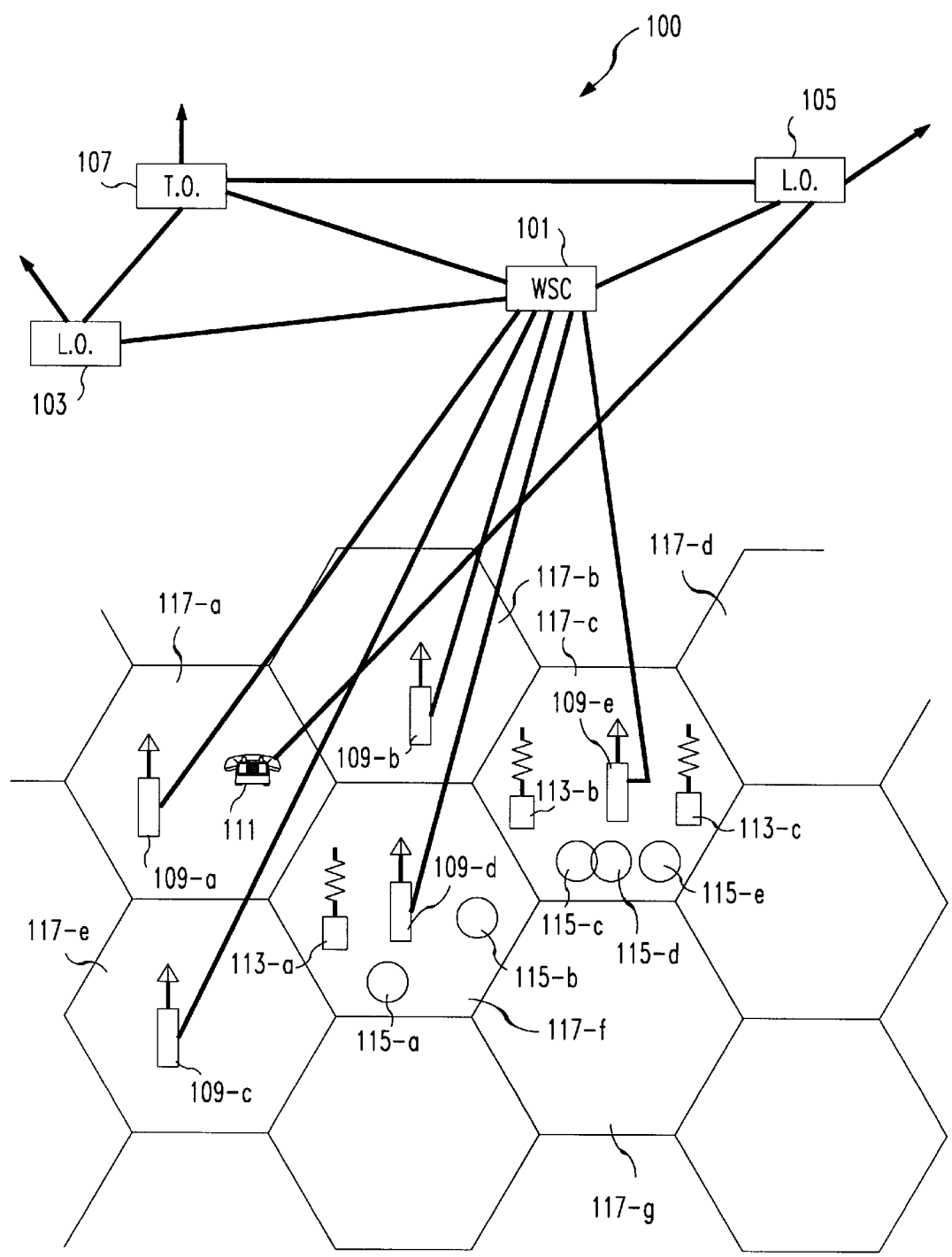
FIG. 1 is a schematic diagram of a portion of a wireless communications system.

Referring to the drawings in which like reference numerals identify similar or identical elements, FIG. 1 shows a portion of a wireless telecommunications system, designated generally as system 100. System 100 serves a number of wireless and wireline terminals situated within a geographic area. The infrastructure of system 100 typically consists of wireless switching center 101 (WSC) interconnected with local switching offices 103 and 105, which can provide access for wireline terminals, and toll switching office 107, which advantageously interconnects local switching offices 103 and 105 and wireless switching center 101 with other local switching offices (not shown) and wireless switching centers (not shown).

Typically, wireless switching center 101 communicates with base stations 109a through 109e, which are dispersed throughout a geographic area serviced by system 100. Wireless switching center 101 is responsible for, among other things, routing, or "switching," calls between wireless communications terminals or, alternatively, between a wireless communications terminal and a wireline terminal, which is accessible to wireless switching center 101 via local and/or long distance networks.

The geographic area serviced by system 100 is typically partitioned into a number of spatially distinct regions called "macrocells," identified as 117-a through 117-g in FIG. 1. As shown in FIG. 1, each macrocell is schematically represented by a hexagon; in practice, however, each macrocell usually has an irregular shape that depends on the topography of the terrain and other factors. Typically, each macrocell contains a "macrocell base station," which includes the antennas and radios that the macrocell base station uses to communicate with wireless communications terminals within the macrocell. Each macrocell base station also includes transmission equipment for communicating with wireless switching center 101.

Communication system 100 is preferably envisaged to carry signals representing any type of information (e.g., audio, video, data, multimedia, etc.). The wireless portion of system 100 is envisaged to support one or more wireless technologies (e.g., Frequency Division Multiple Access (FDMA), Time Division Multiple Access (TDMA), Code Division Multiple Access (CDMA)) in providing one or more services (e.g., cordless, cellular, PCS, wireless local loop, SMR/ESMR, two-way paging, etc.).

Each macrocell may also include one or more microcells, identified as 115-*a* through 115-*e* in FIG. 1. Each microcell encompasses a small predetermined area of a larger macrocell. As shown in FIG. 1, each microcell is schematically represented by a circle; in practice, however, each microcell usually has an irregular shape that depends on the topography of the terrain, relative location of the microcell with respect to buildings, etc.

Figure 2:
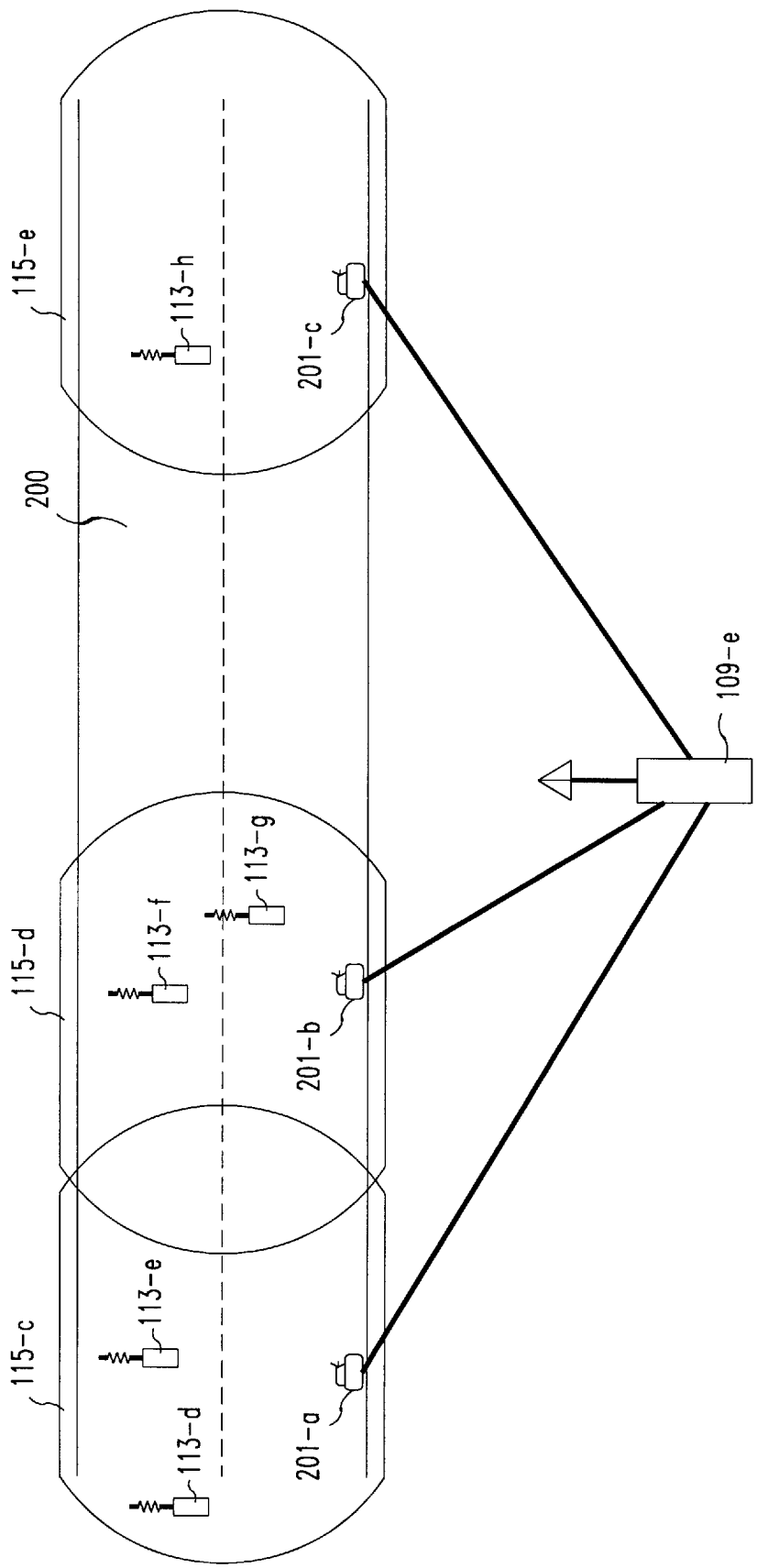
FIG. 2 is a more detailed schematic diagram of a plurality of microcells within the wireless communications system.

FIG. 2 shows a busy street 200 within macrocell 117-*c*, for example, partially covered by microcells 115-*c* through 115-*e*. As shown, microcells 115-*c* through 115-*e* are associated with microcell base stations 201-*a* through 201-*c*, respectively. Each microcell base station 201 is capable of communicating with one or more wireless terminals 113 (e.g., a personal communicator, etc.) presently within their respective cells. In addition, each microcell base station 201 is also capable of communicating with macrocell base station 109-*e*. Each microcell base station 201 can advantageously be mounted to the top of a lamp post or to the side of a building, for example, as required. Each microcell may cover a small segment of a highway, a street along the side of a city block, part of a park, an office floor, etc. Typically, the microcell architecture is employed in areas where communications traffic is high, since it is one of the most effective means of providing high user density wireless communications. Due to the relatively small area of coverage of each microcell, it is generally only necessary that each microcell base station 201 and each wireless terminal 113 radiate power in the milliwatt range.

Figure 3:
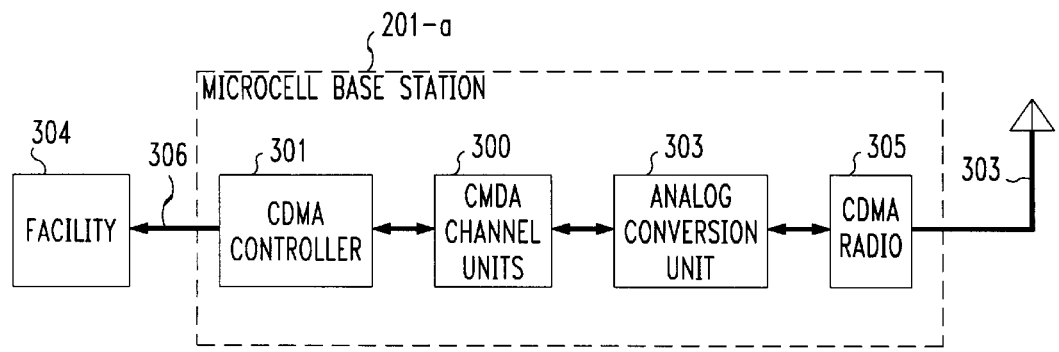
FIG. 3 is a block diagram of a typical microcell base station.

As shown in FIG. 3 in block diagram form, an exemplary microcell base station 201-*a* consists of a miniaturized version of a macrocell base station. For example, microcell base station 201-*a* includes a plurality of CDMA channel units 300 and a CDMA controller 301. The CDMA channel units transmit and receive communication information in the form of digital communication data to and from analog conversion unit 303. CDMA controller 301 includes circuitry for communicating with facility 304 on an available circuit on a trunk 306, which may be a T1 multichannel transmission facility. Facility 304 typically consists, for example, of a wireless switching center or a macrocell base station.

In the downlink signal direction (e.g., transmitting downlink communication information from facility 304 (e.g., a macrocell base station) to microcell base station 201-*a*) communication information from facility 304 is transmitted to microcell base station 201-*a* via trunk 306. The communication information is received by CDMA controller 301 and processed by CDMA channel units 300. The processed communication information is converted by analog conversion unit 303 to analog to obtain baseband in-phase (I) and quadrature (Q) channels. The baseband I and Q channels are modulated by CDMA radio 305 and transmitted via antenna 307 to a wireless terminal.

In the uplink signal direction (e.g., transmitting uplink communication information from microcell base station 201-*a* to facility 304), communication information from a wireless terminal is received by antenna 307. The received communication information is demodulated, filtered and processed by CDMA radio 305 to baseband I and Q channels. The demodulated information is converted to digital form by analog conversion unit 303, and processed by CDMA channel units 300. The processed information is then transmitted by CDMA controller 301 to facility 304 via trunk 306.

As shown, each microcell base station typically includes a plurality of CDMA channel units and a CDMA controller, which are usually very bulky and costly devices. Accordingly, the microcell base station requires bulky packaging to house all of the necessary circuitry and is costly to produce.

According to the present disclosure, in order to reduce cost and size of the microcell base station, the microcell base station is treated as an "extension" of the macrocell base station's RF components.

Figure 4A:
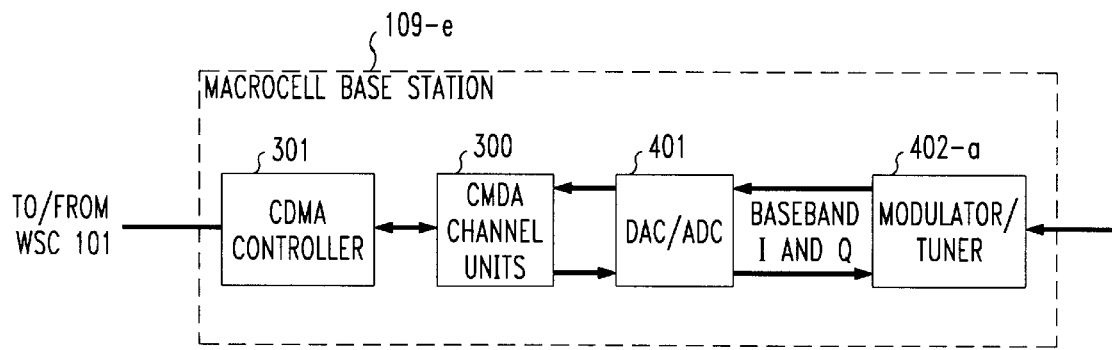
FIGS. 4A and 4B are block diagrams of a macrocell base station and a microcell base station, respectively, according to an embodiment of the present invention.
Figure 4B:
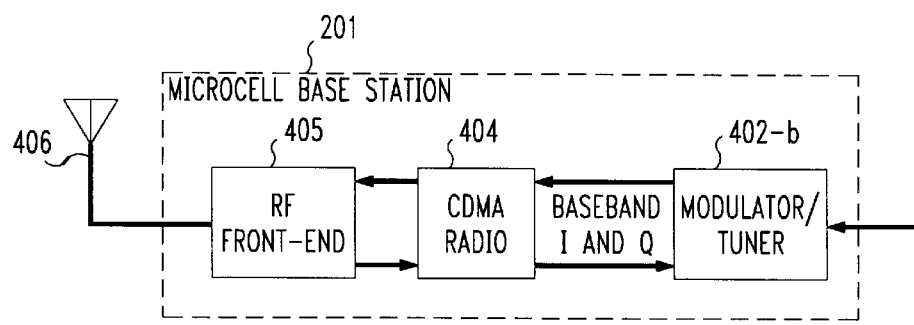

As shown in FIG. 4A, an exemplary macrocell base station 109-*e* according to an embodiment of the present invention includes CDMA controller 301, CDMA channel units 300, DAC/ADC 303 and modulator/tuner 402-*a*. Modulator/tuner 402-*a* communicates with a similar modulator/tuner 402-*b* associated with microcell base station 201, via coaxial cable 403. A suitable low cost modulator/tuner 402 can be a cable TV modulator/tuner manufactured, for example, by Panasonic. Microcell base station 201 also includes CDMA radio 404, RF front end 405 and antenna 406.

In the downlink signal direction (e.g., transmitting from macrocell base station 109-*e* to microcell base station 201) communication information is received from wireless switching center 101 by CDMA controller 301. The received information is processed by CDMA channel units 300. The processed information is converted to baseband I and Q channels by DAC/ADC 401. The converted baseband I and Q channels are modulated by modulator/tuner 402-*a* to a suitable frequency and transmitted via coaxial cable 403 to microcell base station 201. At microcell base station 201, modulator/tuner 402-*b* demodulates the received signal back to baseband I and Q channels. The baseband I and Q channels 0are then processed by CDMA radio 404 and RF front end 405 and transmitted via antenna 406 to a wireless terminal.

In the uplink signal direction (e.g., transmitting from microcell base station 201 to macrocell base station 109-*e*), a signal received via antenna 406 from a wireless terminal is amplified by RF front end 405 and processed and converted to baseband I and Q channels by CDMA radio 404. The baseband I and Q channels are modulated by modulator/tuner 402-*b* and transmitted via cable 403 to macrocell base station 109-*e*. At macrocell base station 109-*e*, the uplink signal is received and demodulated to baseband I and Q channels by modulator/tuner 402-*a*. The baseband I and Q channels are converted to digital format by DAC/ADC 401 and processed by CDMA channel units 300. The processed information is then forwarded to wireless switching center 101 by CDMA controller 301.

Since the same coaxial cable (403) is being used for signal transmission in both the uplink and downlink directions, the frequencies of the modulated uplink and downlink signals should be different. For example, the frequency of the modulated uplink signal may be within the range of 450–550 MHz and the frequency of the modulated downlink signal may be within the range of 5–42 MHz.

Figure 5:
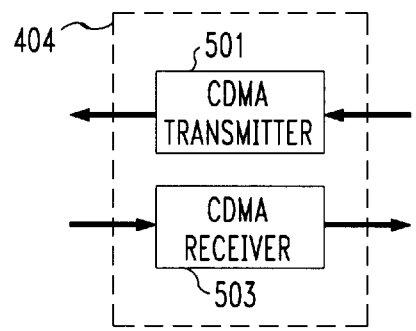
FIG. 5 is a block diagram of a CDMA radio.

As shown in more detail in FIG. 5, CDMA radio 404 consists of CDMA transmitter 501 and CDMA receiver 503. CDMA transmitter 501 modulates the baseband I and Q signals into an Intermediate Frequency (IF) signal, filters the IF signal, up converts the IF signal to a desired RF signal, and amplifies it. Alternatively, it is possible to provide a CDMA transmitter that directly modulates the baseband I and Q signals to a desired RF signal without the use of an IF stage. CDMA receiver 503 receives the CDMA signal and down converts it to an IF stage. Channel separation is then performed at this IF stage with filtering. Automatic gain control can also be implemented to maintain a constant receive signal. The IF signal is then demodulated into separate baseband I and Q signals. Alternatively, it is possible to provide a CDMA receiver that also digitizes the IF signal, and digitally demodulates the IF signal to baseband I and Q signals (in a digital format).

As described above, the microcell base station requires only an RF front-end, a CDMA radio and a modulator/tuner. Accordingly, the microcell base station can be made compact and relatively inexpensive.

Figure 6A:
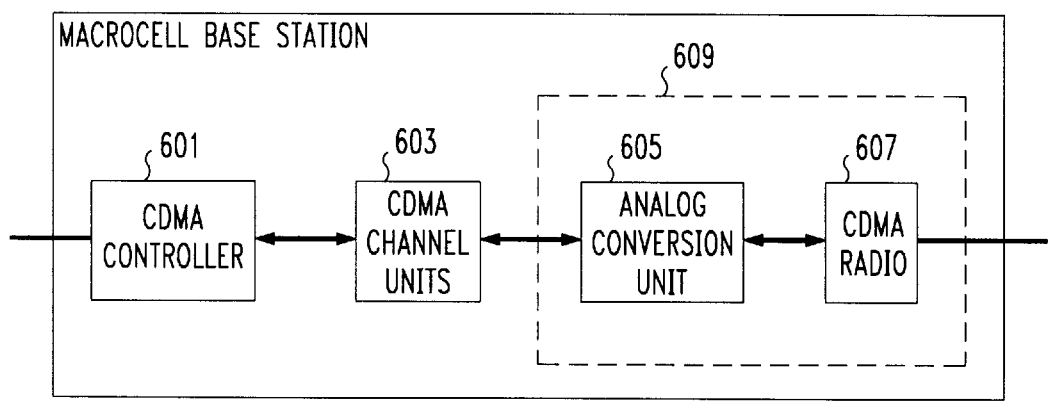
FIG. 6A is a block diagram of a macrocell including a replaceable circuit board.
Figure 6B:
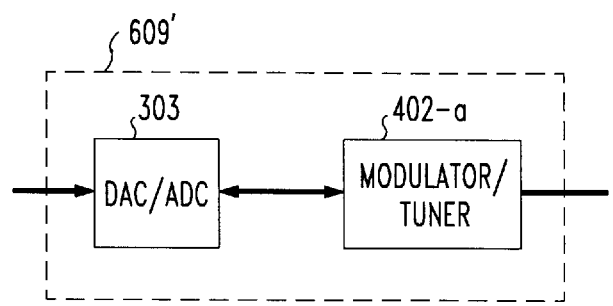
FIG. 6B is a block diagram of a replaceable circuit board.

The above-described communication system can be efficiently implemented in existing communication systems. For example, as shown in FIG. 6A, existing macrocell base stations typically include a replaceable circuit card 609 containing an analog conversion unit 605 for converting downlink signals to baseband I and Q channels and a CDMA radio 607 for processing, modulating and amplifying the baseband I and Q channels for transmission to wireless terminals. Uplink signals are received and converted by CDMA radio 607 to the baseband I and Q channels and converted to digital format by analog conversion unit 605 for processing by CDMA channel units 603. The present invention can be implemented on a circuit board to easily replace circuit card 609. For example, as shown in FIG. 6B, circuit card 609' can be provided for replacing circuit card 609. Circuit card 609' includes DAC/ADC 303 for converting the downlink signals to baseband I and Q channels and modulator/tuner 402 for modulating the baseband I and Q channels to be transmitted via cable 403. Modulator/tuner 402 receives the uplink signal from cable 403 and converts it to baseband I and Q channels. DAC/ADC 303 converts the baseband I and Q channels to digital format for processing by the CDMA channel units. The macrocell base station can thus be easily modified by removing the existing circuit card 609 and replacing it with circuit card 609'.

To reduce the cost of implementing embodiments of the present-invention, cable 403 can be coaxial cable that is already installed, such as that used by cable TV companies. In the alternative, new coaxial cable, twisted pair, etc. can be provided as required. In addition, cable TV modulator/tuner 402 can be replaced with an optical modulator/demodulator and cable 403 can be a fiber optic cable so that optical information can be transmitted between the microcell base station and the macrocell base station. In other words, although the present invention has been described for use with coaxial cable, it should be understood that the present system may be readily implemented using any type of signal transmission scheme suitable for carrying the signal frequencies associated with the particular type of modulator/demodulator chosen.

Although the present disclosure has been described with reference to the use of CDMA technology, it should also be appreciated that the system described herein can also include, for example, frequency division multiple access (FDMA) or time division multiple access (TDMA) systems.

It will be appreciated that the foregoing description and drawings are only intended to be illustrative of the present disclosure. Variations, changes, substitutions and modification of the present disclosure may occur to those skilled in the art without departing from the spirit and scope of the present invention. Accordingly, it is intended that the present disclosure be limited only by the scope of the appended claims.

What is claimed is:

1. A microcell architecture comprising:

a macrocell base station capable of receiving signals from and transmitting signals to at least one microcell base station provided within a first predefined geographic area, the macrocell base station including circuitry for converting downstream code division multiple access (CDMA) coded channel unit information to downstream continuous analog in-phase (I) and quadrature (Q) channels and for modulating the downstream continuous analog I and Q channels for transmission as downstream signals to the microcell base station on a common transmission line, and circuitry for demodulating received upstream continuous analog signals from the common transmission line and for converting the received upstream continvous analog signals to upstream CDMA channel unit information; and at least one microcell base station configured for only Processing downstream signals in analog format and for only generating upstream signals in analog format, provided within the first predefined geographic area, for communicating with wireless terminals within a second smaller predefined geographic area within the first predefined geographic area, the at least one microcell base station receiving and demodulating the downstream continuous analog signals and having a CDMA radio that receives the demodulated downstream continuous analog signals and generates therefrom CDMA coded radio frequency signals for transmission to wireless terminals, the at least one microcell base station also receiving and converting upstream CDMA coded information from wireless terminals to upstream continuous analog I and Q channels and modulating and transmitting the upstream continuous analog I and Q channels on the common transmission line as upstream continuous analog signals to the macrocell base station.

2. A microcell architecture according to claim 1 wherein said downstream and upstream common transmission line comprises at least one radio frequency transmission line.

3. A microcell architecture according to claim 2, wherein the radio frequency transmission line is one of a coaxial cable or a twisted pair.

4. A microcell architecture according to claim 1, wherein the upstream and downstream transmission lines comprise a common transmission line that supports the transmission of the upstream and downstream signals.

5. A microcell architecture according to cliam 1, wherein each of the upstream and downstream transmission line comprises a fiber optic cable.

6. A microcell architecture according to claim 1, wherein the macrocell base station and the at least one microcell base station include modulator/demodulator circuitry for modulating and demodulating the signals communicated therebetween via the upstream and downstream common transmission line.

7. A microcell architecture according to claim 6, wherein the modulator/demodulator circuitry comprise cable TV modulators and tuners.

8. A microcell architecture according to claim 1, wherein the macrocell basestation comprises at least one CDMA channel unit for processing the channel unit information.

9. A microcell architecture according to claim 8, wherein the macrocell basestation further comprises a CDMA controller for controlling the at least one CDMA channel unit.

10. A microcell base station comprising:

an antenna for emitting and receiving electromagnetic signals to and from wireless terminals;

at least one input/output port allowing modulated code division multiple access (CDMA) coded continuous analog information to be received from and transmitted to a communication facility via a common transmission line;

a demodulator for demodulating the modulated CDMA coded continuous analog information received via the at least one input/output port to provide demodulated continuous analog signals;

an analog CDMA radio unit for generating, from the demodulated continuous analog signals, a radio frequency signal to be emitted by the antenna as an electromagnetic signal and for receiving CDMA coded continuous analog information from the wireless terminals, and generating therefrom upstream I and Q analog channels; and a modulator for modulating the upstream analog I and Q channels for transmission via the at least one input/output port and common transmission line to the communication facility.

11. A microcell base station according to claim 10, wherein the modulator comprises a cable TV modulator.

12. A microcell base station according to claim 10, wherein the demodulator comprises a cable TV tuner/demodulator.

13. A method of communicating information between a communication facility and a microcell base station configured or only processin downstream signals in continuous analog format and for only generating upstream signals in analog format, comprising the steps of:

converting downstream CDMA channel unit information to downstream I and Q continuous analog channels;

modulating and transmitting the downstream I and Q continuous analog channels to provide downstream continuous analog signals to the microcell base station;

receiving and demodulating the downstream continuous analog signals at the microcell base station to provide demodulated continuous analog signals; and modulating the demodulated analog signals at the microcell base station to provide a CDMA radio frequency signal for transmission to a wireless terminal.

14. A method of communicating information between a microcell base station configured for only processing downs earn signals in continuous analog format and for only generating upstream signals in continuous analog format and a communication facility, comprising the steps of:

receiving and converting upstream CDMA coded continuous analog information from a wireless terminal to upstream I and Q continuous analog channels;

modulating and transmitting the upstream I and Q continuous analog channels as upstream continuous analog signals to the communication facility;

receiving and demodulating the received upstream continuous analog signals; and converting the received and demodulated upstream continuous analog signals to upstream CDMA channel unit information.

15. A microcell architecture according to claim 1, wherein said downstream signals are transmitted on said common transmission line within a first frequency band and said upstream signals are transmitted on said common transmission line within a second frequency band.

* * * * *